United States Patent [19]

Kramer

[11] Patent Number: 4,679,517
[45] Date of Patent: Jul. 14, 1987

[54] FENDER PROTECTIVE STRUCTURES

[75] Inventor: James H. Kramer, Akron, Ohio

[73] Assignee: The B. F. Goodrich Company, Akron, Ohio

[21] Appl. No.: 844,638

[22] Filed: Mar. 27, 1986

[51] Int. Cl.[4] .............................................. B63C 1/02
[52] U.S. Cl. .................................... 114/45; 114/219; 114/259
[58] Field of Search ................... 114/45, 47, 219, 258, 114/263; 293/102, 107, 134; 405/212, 215

[56] References Cited

U.S. PATENT DOCUMENTS

| | | |
|---|---|---|
| 287,156 | 10/1883 | Peetz ..................................... 114/47 |
| 3,235,244 | 2/1966 | Hein ..................................... 114/219 |
| 3,554,527 | 1/1971 | Hall ..................................... 114/219 |
| 3,610,192 | 10/1971 | Mauritzen ............................. 114/45 |
| 3,798,916 | 3/1974 | Schwemmer ........................ 114/219 |
| 3,863,589 | 2/1975 | Guienne et al. ...................... 114/219 |

Primary Examiner—Joseph F. Peters, Jr.
Assistant Examiner—Stephen P. Avila
Attorney, Agent, or Firm—Joseph Januszkiewicz

[57] ABSTRACT

An impact pad for use in absorbing impact forces wherein the pad is composed of a first outer layer of an ultra-high molecular weight material, an intermediate layer of elastomeric material bonded to the first layer, a third or base layer of ultra-high molecular weight material wherein the base and the elastomeric layers have a plurality of laterally and longitudinally spaced bores to provide the resiliency to the impact forces on the outer layer.

13 Claims, 7 Drawing Figures

FENDER PROTECTIVE STRUCTURES

BACKGROUND OF THE INVENTION

This invention relates to an impact pad for absorbing forces and more particularly to an impact pad or fender protective system for use on a floating structure for absorbing impact forces.

In the operation of docking a ship, because of the speed of approach and the swells, currents and winds, it is imperative to provide a protective docking system to reduce potential damage and impact to the ship. More particularly, an impact pad for use in docking or an impact pad or fender system for use in the hull of a first vessel that receives a second smaller vessel in open waters requires the additional consideration that both vessels interact under these complex factors and, therefore, simple expedients of large shock absorbing devices do not provide the required protection because their weight, their friction factors and their installation cost are too great for economic use. The present invention contemplates the use of a novel impact pad or fender protective device that allows for ease of installation and replacement which can be done under normal repair conditions. An impact pad of the present invention can be used as where ships are docked at wharfs and it is necessary to provide a resilient fender docking system. The impact pad of the present invention can also be used as where hovercraft are to land on a given area that needs a large resilient impact pad. A further use of the present invention is to use such impact pad in the hull of a first ship that carries within it a set of smaller crafts for ferrying operations. Wood reinforcing timbers often used in the hulls of the larger receiving ships or vessels will splinter, split and require numerous replacements. Rubber fender systems offer too much friction for use in these conditions. The present invention uses a composite impact pad that provides a low friction contact surface to minimize the high shearing forces of engagement while utilizing a novel rubber backing support which withstands effectively the impact forces encountered in such ship or vessel receiving systems to protect both vessels.

SUMMARY OF THE INVENTION

The present invention contemplates an impact fender system that utilizes pads in combination wherein each pad has an outer layer of ultra high molecular weight material that is bonded to an intermediate layer of elastomeric material which in turn is bonded to a third layer also composed of ultra high molecular weight material. The intermediate layer and third layer have apertures thereinto that allow the intermediate layer to absorb impact forces.

DETAILED DESCRIPTION

Figure 1:
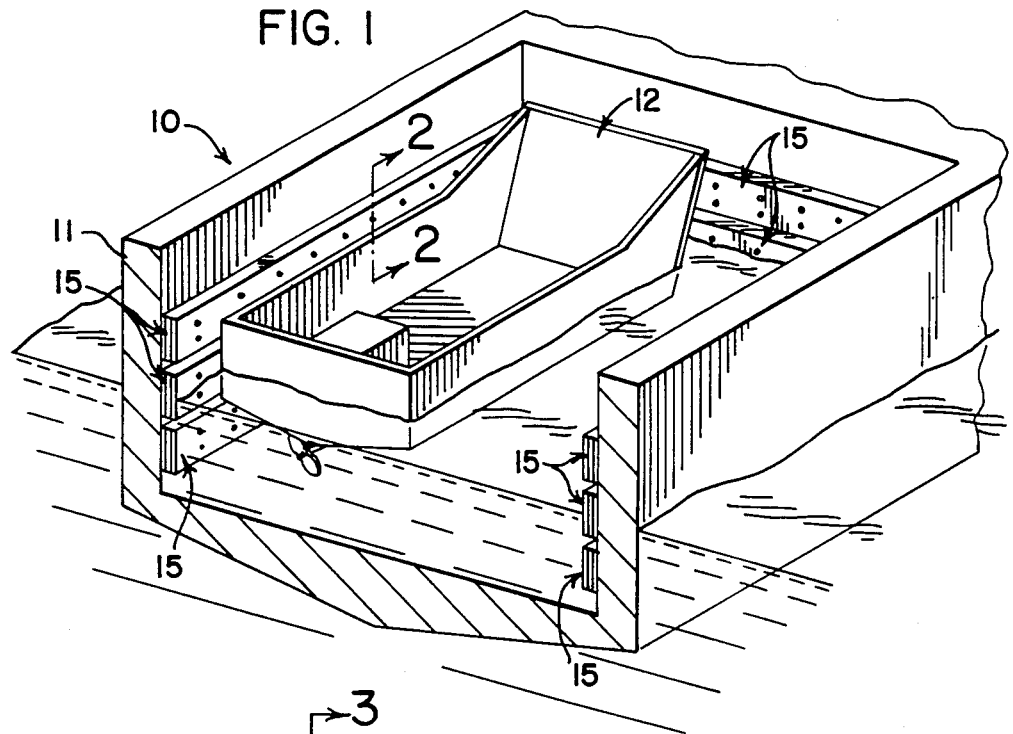
FIG. 1 is a perspective view illustrating one form of the invention wherein the larger vessel, only partly shown, has the fenders disposed along the water level under the vessel, with a second vessel being received in the hull of such first vessel.

Referring to the drawings, wherein like reference numerals designate like or corresponding parts throughout the several views, there is shown in FIG. 1 a portion of a ship or large vessel 10 whose hull is designated by the numeral 11. Such vessel 10 is a docking vessel with an open hull capable of lowering a door, not shown, to allow water into the hull to permit smaller vessels 12 such as landing crafts thereinto whereby the larger vessels may transport such smaller vessels for ferrying operations close to land.

Located above and below the water line, as depicted in FIG. 1, are a plurality of impact pads or fenders 15 extending in a horizontal direction and suitably attached to the hull of the larger vessel 10. Each fender 15 is a composite member which includes a longitudinally extending inwardly disposed (as view in the larger vessel 10) solid piece of ultra-high molecular weight polyethylene material 16, a resilient second elastomeric layer 17 and integrally attached to such second layer 17 a layer of ultra-high molecular weight polyethylene material considered a third layer 18.

The first layer or outermost layer 16, as viewed from inside the larger vessel 10, has an outer surface 20 and an inner surface 21 which are substantially parallel. Such first layer is composed of an ultra-high molecular weight polyethylene which has a melt flow index less than 0.15 measured in accordance with the test procedure of ASTM 1238-65T modified by an additional 3 kilogram load.

Figure 2:
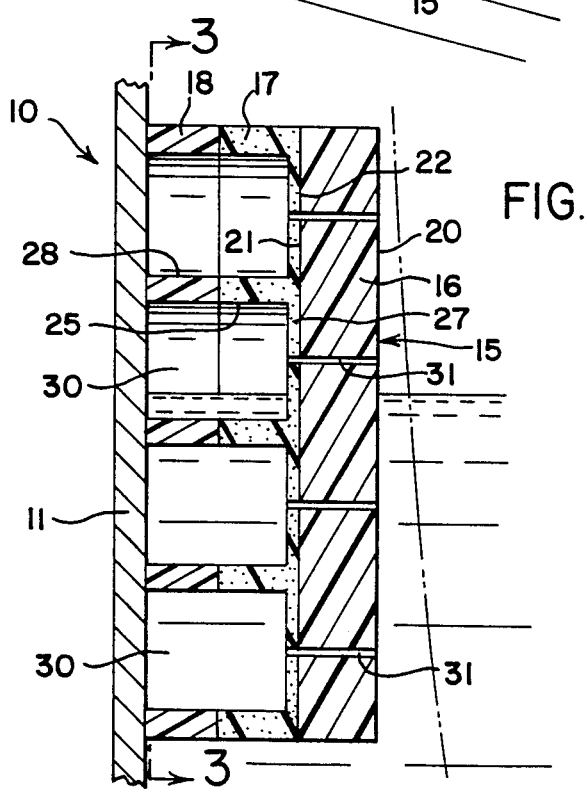
FIG. 2 is a cross sectional view taken of the fender system on line 2—2 of FIG. 1.
Figure 3:
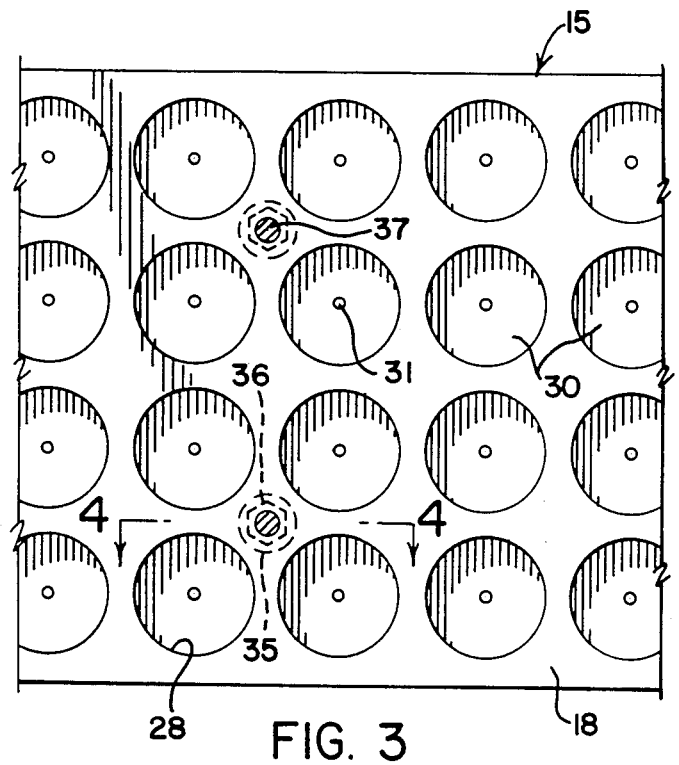
FIG. 3 is a side elevational view of the fender system taken on line 3—3 of FIG. 2.

The second layer 17 has an outer surface 22 that is in abutting contact with and bonded to the inner surface 21 of the first layer 16 of the ultra-high molecular weight material. Such second layer has a plurality of rows of bores 25 which are laterally and longitudinally spaced. Such bores 25, as molded into the second layer 17, extend almost through such second layer leaving a thin layer 27 (FIG. 2) that facilitates the bonding of such second layer 17 of elastomeric material to the first layer 16 of ultra-high molecular weight material. The third layer 18 is of substantially the same thickness and material as the first layer 16 of ultra-high molecular weight material and is bonded to the second layer of elastomeric material 17 during the molding process. Such third layer 18 has a plurality of rows of bores 28 that extend completely through such layer and are in axial alignment with the bores 25 in the second layer. Such layer 18 defines a base layer and provides a rigid integrity to the composite laminate structure so that in its application to a given supporting structure, such as to the hull of a ship or to a dock which may be made of diverse materials, provides a resistive base of known reactive force to the rubber layer which, under those conditions, provides a high energy absorption rate that is controllable. If the base were rubber and attached to a supporting structure such as steel, the base would be of relatively low friction and the force, versus deflective and energy absorption of the rubber with a wet or oily surface, would be quite low and, therefore, ineffective. The open area of the bores of the second layer to the total area of the second layer would be between 30% to 60%, thus permitting sufficient bulging of the elastomeric layer.

Although the preferred form of invention shows the first layer of ultra-high molecular weight material as solid, it could be perforated or have bores as the second and third layer, however, there is a risk that a sharp projection on the impacting vessel or from the second smaller vessel could catch in the bores and rip the pad if the force exceeded the strength of either the rubber or the elastomeric layer or the bond between any layers.

As a preferred thickness for use of the composite laminate structure as a fender protective device for the docking of a ship, the solid ultra-high molecular weight first layer 16 is approximately 1¼ inches (3.175 cm) to ¾ of an inch (1.905 cm) thick. The impact rubber or elastomeric second layer is in the range of 30 to 80 percent of the total opening depth of combined bores 28 and 25 while the thickness of the base or third layer is in the range of 70 to 20 percent of the opening depth.

The respective aligned bores 25 and 28 define a chamber 30 that communicates with the area inside the hull or center portion of the vessel via small, narrow vent holes 31 that extend completely through the first layer 16 of ultra-high molecular weight material and the thin layer 27 of the elastomeric layer so that at times when the water fills the chamber 30, such water will be forced out through the vent holes 31 upon impact from exterior forces to the fender thereby giving a dampening effect that is a desirable feature in addition to the impact deflection of the rubber absorbing action of the second layer.

Figure 4:
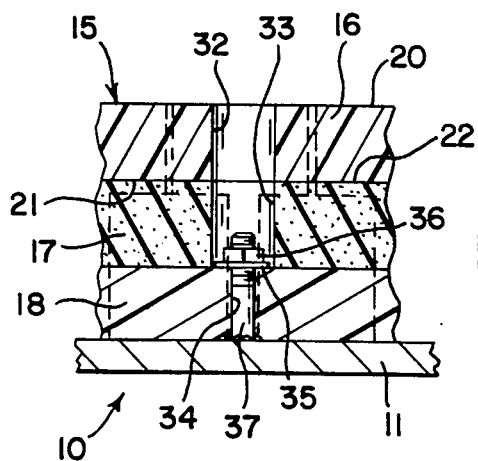
FIG. 4 is a plan view of the fender taken in cross section on line 4—4 of FIG. 3.

To attach such composite laminate fender 15 to the hull of a vessel, the respective first and second layers have a bore 32-33, respectively, extending therethrough in alignment with a narrower bore 34 in the third layer (FIG. 4) defining a shoulder between bores 33 and 34 to receive the flat face of a washer 35 and the head of a nut 36 secured to the threaded head of a bolt 37 that is suitably fastened to the hull 11 of the larger vessel 10.

Figure 6:
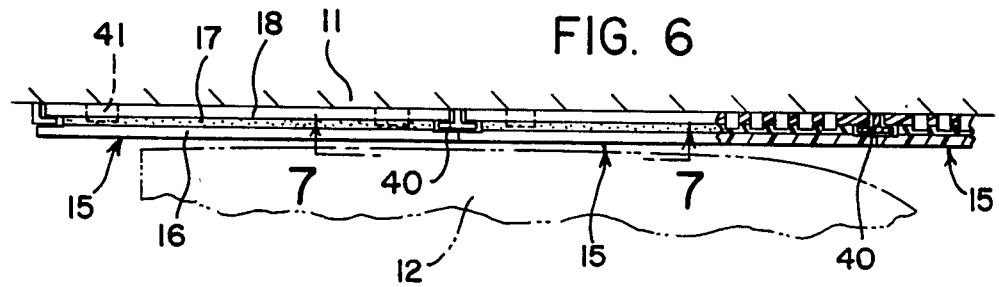
FIG. 6 is a fragmentary plan view of a portion of the fender system installed on the larger vessel showing a portion of the vessel in phantom lines.
Figure 7:
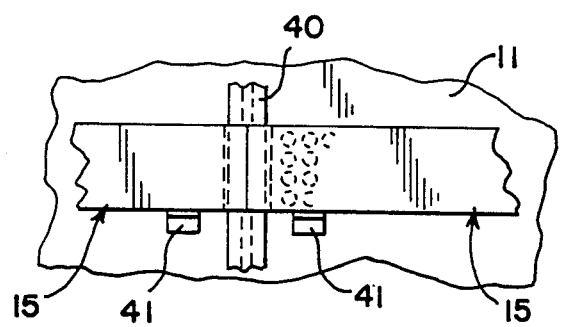
FIG. 7 is a fragmentary side elevational view of a small portion of the fender system shown mounted on the vessel taken on line 7—7 of FIG. 6.

The length of the above described fenders 15 are such that it requires a plurality of horizontally aligned fenders (FIG. 6) to properly protect the hull 11 of the larger boat. As seen in FIG. 6, a plurality of vertically disposed T-shaped members 40 are suitably attached to the inside of the hull 11 to receive the fenders 15. Stops 41 are attached to the hull 11 to limit the placement of the fenders 15 on the hull 11 (FIG. 7).

The invention as described above has been explained in reference to a fender system for a large vessel that receives a smaller vessel or vessels; however, the fender system or impact pad is equally applicable to a system for docking vessels or ships as well as in use for a landing pad for hovercraft which require a resilient receiving area.

Figure 5:
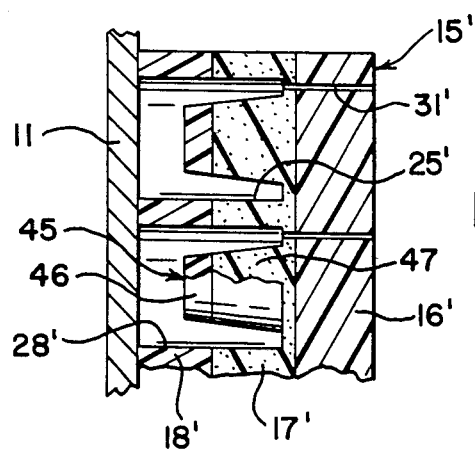
FIG. 5 is a side elevational view in cross section of an alternative form of the fender system.

A further modification of the above described fender or impact pad 15 is shown in FIG. 5 which fender 15' is constructed substantially identically to fender 15 in that it has an outer first layer 16' made from ultra-high molecular weight material, a second or intermediate elastomeric layer 17' with bores 25' and a third layer 18' also with bores 28'. Such third layer 18' is made from ultra high molecular weight material. Such fender 15' during the molding process is provided with suitable projections 45 which define stops which limit the movement of the impact pad or fender 15' towards the hull 11. The stops or projections 45 have an inner layer 46 of ultra-high molecular weight polyethylene material, and an adjoining cylindrically shaped layer 47 of elastomeric material that merges with the elastomeric intermediate layer 17'. As in the first embodiment, fender 15' has vent holes 31' to act as means for venting water that must be displaced where fender 15' is under an impact loading.

It will be apparent that although a specific embodiment and a certain modification of the invention has been described in detail, the invention is not limited to the specifically illustrated and described constructions since variations may be made without departing from the principles of the invention.

I claim:

1. In a fender system for inside the hull of a ship comprising an elongated longitudinally extending fender, said fender having a first layer of ultra-high molecular weight material, a second resilient layer bonded to said first layer, said second layer having a plurality of openings in laterally spaced and longitudinally spaced relationship, a third layer of rigid non-resilient material bonded to said second layer, said third layer having a plurality of openings in laterally and longitudinally spaced alignment with said openings in said second layer, vent holes in said fender that communicate said aligned openings with the interior of said hull for venting fluids, and means for attaching said third layer to said hull of said ship.

2. In a fender system as set forth in claim 1 wherein the open area of said openings of said third layer is in the range of thirty to sixty percent of the total area of said third layer.

3. In a fender system as set forth in claim 2 wherein said third layer is made from an ultra-high molecular weight material.

4. In a fender system as set forth in claim 3 wherein the thickness of said second layer is in the range of one-fourth to one-half of the total thickness of said fender.

5. In a fender system as set forth in claim 1 wherein the thickness of said second layer is in the range of one inch to four inches thick.

6. In a fender system as set forth in claim 2 wherein said fender has stop means located in said openings that limit the movement of said first layer toward the direction of said third layer.

7. In a fender system as set forth in claim 6 wherein said stop means includes abutment means in each of said openings, and said abutment means is made from a layer of elastomeric material that is integral with said second layer that is adjacent said first layer, and said abutment means has a rigid outer end portion remote from that end portion that joins said second layer.

8. An impact pad for use in absorbing impacts comprising a composite pad with an outer layer of rigid non-resilient low-friction material, said outer layer having an outer surface and an inner surface, said pad having a second intermediate layer of elastomeric material bonded to said inner surface of said outer adjacent layer, a rigid base layer bonded to said intermediate elastomeric layer said elastomeric layer and said base layer having coextensive apertures extending through said base layer and substantially through said elastomeric layer to provide a resiliency to an impact force on said outer layer, wherein each of said coextensive apertures define a chamber, and narrow vent bores in said composite pad communicates said chambers through said pad to the exterior of said outer surface of said outer layer.

9. An impact pad as set forth in claim 8 wherein the open area of said aperture of said base layer is in the range of thirty to sixty percent of the total area of said third layer.

10. An impact pad as set forth in claim 9 wherein the thickness of said intermediate elastomeric layer is in the range of one-fourth to one-half of the total thickness of said pad.

11. An impact pad as set forth in claim 10 wherein said first layer and said base layer are made from ultra-high molecular weight material.

12. An impact pad as set forth in claim 11 wherein the thickness of said second layer of elastomeric material is in the range of one inch to five inches thick.

13. An impact fender system for use in absorbing shocks and impact forces comprising a plurality of longitudinally extending impact fenders in laterally spaced rows, each of said fenders having a plurality of pads in horizontal alignment, each pad having an outer layer of ultra-high molecular weight material, each of said pads having a second intermediate layer of elastomeric material bonded to one of the surfaces of said outer layer, each of said outer layers having the other surfaces facing exterior of said pad, a base layer bonded to each of said elastomeric layers, each of said elastomeric layers and said base layer in adjacent abutting relationship having coextensive apertures extending through said base layer and into said elastomeric layer to define a plurality of chambers which facilitates the compression and bulging of said elastomeric layer on said fender receiving an impoact force, and vent holes extending through each of said fenders communicating said chambers exteriorly of and through said other surface of said pads.

* * * * *